United States Patent [19]
Blanchard et al.

[11] Patent Number: 5,976,476
[45] Date of Patent: Nov. 2, 1999

[54] CATALYTIC COMPOSITION COMPRISING A MIXTURE OF CERIUM OXIDE WITH MANGANESE, IRON OR PRASEODYMIUM OXIDE, PROCESS FOR ITS PREPARATION AND ITS USE IN AUTOMOBILE AFTERBURNING CATALYSIS

[75] Inventors: Gilbert Blanchard, Lagny-Le-Sec; Eric Quemere, Cormeilles-En-Parisis; Olivier Touret, La Rochelle; Valérie Visciglio, Paris, all of France

[73] Assignee: Rhodia Chimie, Courbevoie, France

[21] Appl. No.: 08/860,955

[22] PCT Filed: Jan. 10, 1996

[86] PCT No.: PCT/FR96/00039

§ 371 Date: Sep. 9, 1997

§ 102(e) Date: Sep. 9, 1997

[87] PCT Pub. No.: WO96/21506

PCT Pub. Date: Jul. 18, 1996

[30] Foreign Application Priority Data

Jan. 13, 1995 [FR] France ................... 95 00344

[51] Int. Cl.$^6$ ................ B01J 8/02; B01J 31/00; C01B 17/16; C01G 45/02
[52] U.S. Cl. ................ 423/213.2; 423/213.5; 423/231; 423/605; 423/632; 502/102; 502/303
[58] Field of Search ................ 423/231, 605, 423/632, 213; 502/102, 303; 252/462

[56] References Cited

U.S. PATENT DOCUMENTS

| | | | |
|---|---|---|---|
| 4,294,726 | 10/1981 | Bozon et al. | 252/462 |
| 4,378,307 | 3/1983 | Brunelle et al. | 252/455 R |
| 5,179,059 | 1/1993 | Domesle et al. | 502/303 |
| 5,610,117 | 3/1997 | Horiuchi et al. | 502/324 |
| 5,643,543 | 7/1997 | Guibard et al. | 423/213.5 |

*Primary Examiner*—Gary P. Straub
*Assistant Examiner*—Cam N. Nguyen
*Attorney, Agent, or Firm*—Katherine L. Carleton

[57] ABSTRACT

The invention provides a catalytic composition which is based on a cerium oxide and on at least one other oxide chosen from iron, manganese and praseodymium oxides, which controls $H_2S$ emissions in the catalysis of treatment of automobile exhaust gas.

15 Claims, No Drawings

CATALYTIC COMPOSITION COMPRISING A MIXTURE OF CERIUM OXIDE WITH MANGANESE, IRON OR PRASEODYMIUM OXIDE, PROCESS FOR ITS PREPARATION AND ITS USE IN AUTOMOBILE AFTERBURNING CATALYSIS

This application is an application under 35 U.S.C. Section 371 of International Application Number PCT/FR96/00039, filed on Jan. 10, 1996.

The present invention relates to a catalytic composition based on cerium oxide and on manganese, iron or praseodymium oxide, to a process for its preparation and to its use in automobile afterburning catalysis.

So-called multifunctional catalysts are currently used for the treatment of exhaust gases from internal combustion engines (automobile afterburning catalysis). Multifunctional catalysts in understood to mean catalysts capable of carrying out not only oxidation, in particular of carbon monoxide and hydrocarbons present in exhaust gases, but also reduction, in particular of nitrogen oxides also present in these gases ("three-way" catalysts).

For this type of catalyst, cerium oxide is a commonly used component. This oxide is generally present on a support, such as alumina.

As fuels contain sulphur, cerium oxide and the support become sulphated. When the atmosphere of the catalyst becomes reducing, for example when the power demand of the engine suddenly ceases, the sulphates attached to the oxide and the support are reduced to $H_2S$ which causes the emission of nauseating smells.

In point of fact, for obvious environmental reasons, it is important to reduce $H_2S$ emissions.

One solution proposed is to add nickel oxide to the catalytic formulation. However, in certain countries, especially in Europe, nickel is banned by the standards enforced in this technical field, so this solution cannot be applied.

There exists therefore a real need for a catalytic composition which can be used in automobile afterburning catalysis which makes it possible to control $H_2S$ emissions.

With this aim, the catalytic composition according to the invention in characterized in that it is based on a cerium oxide and on at least one other oxide chosen from iron, manganese and praseodymium oxides.

Moreover, according to a first embodiment, the process for the preparation of a composition according to the invention in characterized in that it comprises the following stages:

a mixture is prepared in liquid medium containing a cerium compound and at least one iron, manganese or praseodymium compound;

the said mixture is heated;

the precipitate thus obtained is recovered;

the said precipitate is calcined.

According to a second embodiment, the process for the preparation of a composition according to the invention is characterized in that it comprises the following stages:

a mixture is prepared in liquid medium containing a cerium compound and at least one iron, manganese or praseodymium compound;

a basic compound is added to the said mixture, whereby the mixture is caused to precipitate;

the precipitate thus obtained is recovered;

the said precipitate is calcined.

According to a third embodiment, the process for the preparation of a composition according to the invention is characterized in that it comprises the following stages:

a mixture is prepared in liquid medium containing a cerium sol and at least one iron, manganese or praseodymium compound;

the mixture thus obtained in dried by atomization;

the dried product is calcined.

Finally, according to a fourth embodiment, the process for the preparation of a composition according to the invention in characterized in that a cerium oxide is impregnated with a solution of at least one iron, manganese or praseodymium compound and the impregnated cerium oxide is then calcined.

Other characteristics, details and advantages of the invention will become still more completely apparent on reading the description which will follow, as well as the various concrete but non-limiting examples intended to illustrate it.

As indicated above, the catalytic compositions of the invention are based on cerium and on at least one other oxide chosen from iron, manganese and praseodymium oxides. The invention therefore relates to the composition based on all the possible combinations of these elements. Mention will more particularly be made of compositions based on cerium and on manganese and based on cerium, on iron and on praseodymium.

According to a specific alternative form of the invention, the compositions exhibit a major phase of solid solution or mixed oxide type. According to yet another alternative for, the composition of the invention exist entirely in the form of a solid solution. Solid solution is understood to mean that the X-ray diffraction spectra of these compositions in fact reveal, within the latter, the existence of only a single identifiable phase (absence of detectable secondary phase) which corresponds in fact to that of a ceric oxide crystallized in the cubic system in which the unit cell parameters are more or less offset with respect to a pure ceric oxide, thus reflecting the incorporation of manganese, of iron and/or of praseodymium in the crystal lattice of the cerium oxide and thus the preparation of a true solid solution.

The amount of manganese, of iron and/or of praseodymium in the composition can vary within wide limits. Generally, this proportion can range up to a ratio by mass, expressed as oxide of this or these elements with respect to cerium oxide, of 50%. It is generally at least 0.5%. This proportion can thus be between 1 and 40%, in particular between 1 and 20% and more particularly between 1 and 10%.

According to the alternative forms of the invention, the composition can additionally comprise zirconium.

The compositions of the invention exhibit, after calcination for 6 hours at 400° C., a specific surface of at least 10 $m^2/g$, preferably of at least 60 $m^2/g$ and more particularly of at least 80 $m^2/g$. The specific surface is understood to mean the B.E.T. specific surface determined by nitrogen adsorption in accordance with the ASTM standard D 3663-78 laid down from the Brunauer-Emmett-Teller method described in the periodical "The Journal of the American Chemical Society, 60, 309 (1938)".

According to a preferred embodiment of the invention, another characteristic of the compositions of the invention in their chemical homogeneity. In fact, they exhibit a chemical homogeneity such that the heterogeneity domains are less than 10 $nm^2$. This means that there is no difference in the chemical composition of the products of the invention between surface regions of 10 $nm^2$.

These homogeneity characteristics are determined by TEM-EDS analysis. More particularly, the heterogeneity domain was measured by the method of mapping by energy dispersion spectroscopy (EDS) by using a transmission electron microscopy (TEM) electron probe.

Another characteristic of the compositions of the invention is their ability to store oxygen even after exposure to high temperatures. Thus, after calcination for 6 hours under air at 900° C., these compositions generally exhibit an oxygen storage of at least 1 ml $O_2$/g of composition and more particularly of at least 1.5 ml $O_2$/g.

Different preparation processes can be used for the compositions of the invention.

According to a first embodiment of the invention, a process is used which is characterized in that it comprises the following stages:

a mixture is prepared in liquid medium containing a cerium compound and at least one iron, manganese or praseodymium compound;

the said mixture is heated;

the precipitate thus obtained is recovered.

the said precipitate is calcined.

The first stage of the process according to the invention therefore consists in preparing a mixture in liquid medium, generally in the aqueous phase, containing at least one cerium compound and at least one iron, manganese or praseodymium compound. These compounds are preferably soluble compounds. The mixture can without distinction be obtained either from compounds initially in the solid state which will subsequently be introduced into a water vessel heel or alternatively directly from solutions of these compounds followed by mixing the said solutions in any order.

Mention may particularly be made, as water-soluble cerium compounds, of cerium(IV) salts, such as nitrates or ceric ammonium nitrates for example, which are particularly well suited in this instance. Ceric nitrate is preferably used. The solution of cerium(IV) salts can without disadvantage contain cerium in the cerous state but it is desirable for it to contain at least 85% of cerium(IV). An aqueous ceric nitrate solution can, for example, be obtained by reaction of nitric acid with a ceric oxide hydrate prepared conventionally by reaction of a solution of a cerous salt, for example cerous carbonate, and of an aqueous ammonia solution in the presence of hydrogen peroxide. Use can also preferably be made of a ceric nitrate solution obtained according to the process of electrolytic oxidation of a cerous nitrate solution as described in the document FR-A-2,570,087, which constitutes in this instance a starting material of choice.

It will be noted here that the aqueous solution of cerium (IV) salts can exhibit a degree of initial free acidity, for example a normality varying between 0.1 and 4N. According to the present invention, it is just as possible to use an initial solution of cerium(IV) salts effectively exhibiting a degree of free acidity as mentioned above as a solution which would have been neutralized beforehand more or less exhaustively by addition of a base, such as for example an aqueous ammonia solution or alternatively a solution of alkali metal (sodium, potassium and the like) hydroxides, but preferably an aqueous ammonia solution, so as to limit this acidity. It is then possible, in the latter case, to define in practice a degree of neutralization (r) of the initial cerium solution by the following equation:

$$r = \frac{n3 - n2}{n1}$$

in which n1 represents the total number of moles of Ce(IV) present in the solution after neutralization; n2 represents the number of moles of OH⁻ ions effectively necessary to neutralize the initial free acidity introduced by the aqueous cerium(IV) salt solution; and n3 represents the total number of moles of OH⁻ ions introduced by the addition of the base. When the "neutralization" alternative form is implemented, use in made in all cases of an amount of base which absolutely must be less than the amount of base which would be necessary to obtain complete precipitation of the hydroxide species Ce(OH)$_4$ (r=4). In practice, the limit is therefore set at degrees of neutralization which do not exceed 1 and preferably still do not exceed 0.5.

Mention may be made, as iron, manganese or praseodymium compounds which can be used in the process of the invention, of, for example, the salts of inorganic or organic acids, for example of the sulphate, nitrate, chlorate or acetate type. It will be noted that the nitrate in particularly well suited. These compounds can also be introduced in the form of sols. These sols can be obtained, for example, by neutralization by a base of a salt of these compounds.

The amounts of cerium, of iron, of manganese or of praseodymium present in the mixture must correspond to the stoichiometric proportions required in order to obtain the final desired composition.

The initial mixture thus being obtained, it is then heated in accordance with the second stage of the process according to the invention.

The temperature at which this heat treatment, also known as thermohydrolysis, is carried out can be between 80° C. and the critical temperature of the reaction mixture, in particular between 80 and 350° C. and preferably between 90 and 200° C.

This treatment can be carried out, according to the temperature conditions used, either at normal atmospheric pressure or under pressure, such as, for example, the saturated vapour pressure corresponding to the temperature of the heat treatment. When the treatment temperature is chosen to be greater than the reflux temperature of the reaction mixture (that is to say generally greater than 100° C.), for example chosen between 150 and 350° C., the operation is then carried out by introducing the aqueous mixture containing the abovementioned species into an enclosed space (closed reactor more commonly known as an autoclave), the necessary pressure then resulting only from the heating alone of the reaction mixture (autogenous pressure). Under the temperature conditions given above, and in aqueous medium, it is thus possible to specify, by way of illustration, that the pressure in the closed reactor varies between a value greater than 1 bar ($10^5$ Pa) and 165 bar ($165 \times 10^5$ Pa), preferably between 5 bar ($5 \times 10^5$ Pa) and 165 bar ($165 \times 10^5$ Pa). It is of course also possible to exert an external pressure which in then added to that resulting from the heating.

The heating can be carried out either under an air atmosphere or under an inert gas atmosphere, preferably nitrogen.

The duration of the treatment is not critical and can thus vary within wide limits, for example between 1 and 48 hours and preferably between 2 and 24 hours. Likewise, the temperature rise takes place at a rate which is not critical and it is thus possible to reach the set reaction temperature by heating the mixture for example between 30 minutes and 4 hours, these values being given entirely by way of indication.

On conclusion of the heating stage, a solid precipitate is recovered which can be separated from its mixture by any conventional solid/liquid separation technique, such as, for example, filtration, settling, drying or centrifuging.

If necessary, it is possible to introduce, before and/or after the heating stage, a base, such as, for example, an aqueous ammonia solution, into the precipitation mixture. This makes it possible to increase the recovery yields of the precipitated species.

It is also possible, in the same way, to add, before and/or after the beating stage, hydrogen peroxide, either alone or also in combination with the base.

It will be noted that it is, of course, possible to repeat one or a number of times, in an identical or nonidentical way, a heating/precipitation stage as defined above, in then implementing, for example, heat treatment cycles.

The product as recovered can then be subjected to washings with water and/or with aqueous ammonia, at a temperature between ambient temperature and the boiling temperature. In order to remove the residual water, the washed product can finally, optionally, be dried, for example in air, at a temperature which can vary between 80 and 300° C. and preferably between 100 and 150° C., drying being continued until a constant weight is obtained.

In a last stage of the process, the recovered precipitate, optionally after washing and/or drying, is then calcined. This calcination is carried out at a temperature generally of between 200 and 1200° C. and preferably between 300 and 900° C. This calcination temperature must be sufficient to convert the precursors to oxides and it is also chosen as a function of the temperature of subsequent use of the catalytic composition, it being taken into account that the specific surface of the product becomes smaller as the calcination temperature employed becomes higher. The duration of the calcination can, for its part, vary within wide limits, for example between 1 and 24 hours and preferably between 4 and 10 hours. The calcination is generally carried out under air but a calcination carried out, for example, under an inert gas is very clearly not excluded.

According to a second embodiment, the process for the preparation of a composition according to the invention is characterized in that it comprises the following stages:

a mixture is prepared in liquid medium containing a cerium compound and at least one iron, manganese or praseodymium compound;

the said mixture is brought together with a basic compound, whereby the mixture is caused to precipitate;

the precipitate thus obtained is recovered;

the said precipitate is calcined.

Everything which has been said above in the description of the first embodiment for the preparation of the mixture in liquid medium also applies in this instance.

However, it will be added that it is also possible to use a cerium sol.

The cerium sols can be obtained by any suitable technique, in particular, but not limitingly, according to the methods described in Patent Applications FR-A-2,583,735, FR-A-2,583,736, FR-A-2,583,737, FR-A-2,596,380, FR-A-2,596,382, FR-A-2,621,576 and FR-A-2,655,972, which are all on behalf of the Applicant Company and the teachings of which are included here by way of reference.

According to the present invention, it is possible to use cerium sols, the mean size of which, as determined by quasielastic light scattering, can vary from 3 nm to 100 nm and preferably between 5 and 50 mn.

It should be noted that it is also possible to start from solutions of cerous and manganese(II) or iron(III) salts. In this case, an oxidizing agent, such as hydrogen peroxide, in added to the starting mixture.

In the second stage of this second embodiment of the invention, the said mixture is brought together with a basic compound. Products of hydroxide type can be used as base or basic compound. Alkali metal or alkaline-earth metal hydroxides may be mentioned. It is also possible to use secondary, tertiary or quaternary amines. However, amines and aqueous ammonia may be preferred insofar as they decrease the risks of pollution by alkali metal or alkaline-earth metal cations. Mention may also be made of urea. The reactants can be introduced in any order, it being possible for the basic compound to be introduced into the mixture or vice versa or it being possible alternatively for the reactants to be introduced simultaneously into the reactor.

The addition can be carried out all at once, gradually or continuously, and it is preferably carried out with stirring. This operation can be carried out at a temperature between ambient temperature (18–25° C.) and the reflux temperature of the reaction mixture, it being possible for the latter to reach 120° C., for example. It is preferably carried out at ambient temperature.

At the end of the addition of the basic solution, it is optionally possible to still keep the reaction mixture stirring for a little while, in order to complete the precipitation. on conclusion of the precipitation stage, a mass of a solid precipitate is recovered which can be separated from its mixture by any conventional technique.

The washing and calcination stages are then carried out in the same way as that described for the first embodiment.

According to a third embodiment, the process for the preparation of a composition according to the invention is characterized in that it comprises the following stages;

a mixture is prepared in liquid medium containing a cerium sol and at least one iron, manganese or praseodymium compound;

the mixture thus obtained is dried by atomization;

the dried product is calcined.

As regards the first stage of this third embodiment of the invention, everything which was described above on this subject for the preceding embodiments also applies in this instance. It will be added that the elements other than cerium can optionally also be introduced in the sol form.

The second stage of the process of this third embodiment is a drying by atomization, that is to say by spraying the mixture into a hot atmosphere (spray drying). The atomization can be carried out by means of any sprayer known per se, for example with a spray nozzle of the shower head or other type. It is also possible to use so-called rotary atomizers. Reference may especially be made, on the various spraying techniques capable of being used in the present process, to the standard work by Masters entitled "Spray Drying" (second edition, 1976, published by George Godwin—London).

It will be noted that it is also possible to implement the atomization/drying operation by means of a "flash" reactor, for example of the type developed by the Applicant Company and described especially in Patent Applications FR-A-2,257,326, FR-A-2,419,754 and FR-A-2,431,321. In this case, the treating gases (hot gases) are driven with a helical movement and flow in a vortex sink. The mixture to be dried is injected along a trajectory which joins with the axis of symmetry of the helical trajectories of the said gases, which makes it possible to completely transfer the amount of movement of the gases to the mixture to be treated. The gases thus in fact provide a double function: on the one hand, the spraying, that in to say the conversion of the initial mixture to fine droplets and, on the other hand, the drying of the droplets obtained. Moreover, the extremely low residence time (generally less than approximately $1/10$ second) of the particles in the reactor has the advantage, inter alia, of limiting possible risks of overheating as a result of an excessively long contact with the hot gases.

Depending on the respective flow rates of the gases and of the mixture to be dried, the inlet temperature of the gases in the "flash" reactor is between 400 and 900° C. and more particularly between 600 and 800° C. and the temperature of the dried solid is between 100 and 250° C. and preferably between 125 and 200° C.

On conclusion of this drying stage, a dry product is obtained which can optionally be calcined in the same way as that described for the preceding embodiments.

The three embodiments described above constitute the preferred processes for obtaining the compositions of the invention possessing high chemical homogeneity described above.

According to a fourth embodiment, the process for the preparation of a composition according to the invention is characterized in that a cerium oxide in impregnated with a solution of at least one iron, manganese or praseodymium compound and the impregnated cerium oxide is then calcined.

The ceric oxides which can be used in the invention are products which are already well known per se and they have been widely described in the literature, in particular in many patents or patent applications. They are also commercially available.

They can in particular be prepared by heating a ceric hydroxide or certain oxygen-containing salts, such as nitrates, sulphates, carbonates, oxalates or acetates (cf. Paul Pascal, "Nouveau Traite de Chimie Minerale [New Treatise on Inorganic Chemistry]", Volume VII, p. 777, (1959)), in air between 400 and 1000° C., it being possible for the ceric hydroxide to be in the form of precipitates or of colloidal suspensions. They can also involve cerium oxides, such as described in Patent Applications FR-A-2,559,754, FR-A-2,640,954 or FR-A-300,852, in particular.

The ceric oxides used preferably exhibit a specific surface of at least 10 $m^2/g$, more particularly greater than 80 $m^2/g$ and more advantageously still between 80 and 300 $m^2/g$.

It can be advantageous in certain applications to shape them by agglomerating their constituent particles according to well known techniques of extrusion or of pelleting by pressure, for example.

As indicated above, a mixing is then carried out by impregnating the ceric oxide with a solution of a manganese, iron and/or praseodymium compound. This or these compounds are chosen from those which can be thermally decomposed to oxide and which will be known in a simplified way as oxide precursor.

Mention may be made, as suitable oxide precursors, of the salts of organic or inorganic acids, such as nitrates, chlorides, sulphates or acetates, for example. Nitrates are the preferred precursors.

According to a preferred alternative form of this fourth embodiment of the process according to the invention, the impregnation is carried out "dry", that is to say that the total volume of solution used is approximately equal to the total pore volume developed by the ceric oxide. With regard to the determination of this pore volume, it can be carried out according to the known method with a mercury porosity meter or else by measuring the amount of water absorbed by a sample.

However, it is also possible to impregnate the support by steeping the latter in the solution of the oxide precursor or precursors and to remove the excess of solution by drying.

In a second stage, the impregnated ceric is oxide is dried in order to remove the water, the oxide precursors thus being left in a form dispersed homogeneously and intimately in, or at the surface of, the ceric oxide.

The drying is most often carried out in air, at a temperature which can vary between 80 and 300° C. and preferably chosen between 100 and 150° C. Drying is continued until a constant weight is obtained. The duration of the drying is generally between 1 and 24 hours.

Finally, in a third stage, the impregnated ceric oxide is calcined under the same conditions as those described above.

The compositions of the invention as obtained in the processes described above exist in the form of powders but they can optionally be shaped in order to exist in the form of granules, balls, cylinders or honeycombs of variable sizes. These compositions can be applied to any support commonly used in the field of catalysis, such as, for example, $ZrO_2$, $Al_2O_3$, $TiO_2$ or $SiO_2$. The compositions can also be used in catalytic systems comprising a coating (wash coat), based on these compositions, on a substrate of the metal or ceramic monolith type, for example. The coating can itself also contain a support of the type of those mentioned above.

The invention also relates to the use of a composition or of a catalytic system as described above in the manufacture of a catalyst for automobile afterburning.

Finally, the invention relates to the use of these compositions or of these catalytic systems in the catalysis of automobile afterburning, in particular for the purpose of controlling $H_2S$ emissions.

The invention thus covers a process for the treatment of exhaust gases from internal combustion engines, in particular from car engines, in particular for the purpose of controlling $H_2S$ emissions, which is characterized in that a composition as described above is used as catalyst.

In the case of these uses in catalysis, the compositions of the invention can be employed in combination with precious metals. The nature of these metals and the techniques for the incorporation of the latter in these compositions are well known to the person skilled in the art. For example, the metals can be platinum, rhodium, palladium, ruthenium or iridium and they can in particular be incorporated in the compositions by impregnation.

Nonlimiting examples will now be given.

EXAMPLE 1

This example illustrates the synthesis of an oxide of cerium and of manganese in the proportions, by weight, $CeO_2$ 90% and $MnO_2$ 10%.

A first manganese nitrate solution is mixed with a second ceric nitrate solution, the initial free acidity of which was neutralized beforehand by addition of aqueous ammonia until a degree of neutralization r (as defined above in the description) equal to 0.5 is obtained, in the stoichiometric proportions required in order to obtain the above oxide.

The mixture thus obtained is then placed in an autoclave in order to be subjected therein to a heat treatment at 150° C. for 4 hours, with constant mechanical stirring of the mixture.

On conclusion of this treatment, an aqueous ammonia solution is introduced into the suspension obtained so as to bring the pH to 9, the whole mixture then being stirred for 30 minutes in order to homogenize it.

A precipitate is then recovered by settling and withdrawing the mother liquors and is then resuspended in water. This suspension is then heated at 100° C. for 1 hour.

The product is again filtered and then dried by atomization at 110° C.

The dried product is finally calcined under air for 6 hours at 400° C. The specific surface of the product obtained is 95 $m^2/g$.

The X-ray diffraction diagram of the product shows the presence of a cubic phase very substantially crystallized in the $CeO_2$ system. TEM-EDS analysis shows a heterogeneity of less than 10 $nm^2$.

EXAMPLE 2

This example relates to the synthesis of an oxide of cerium, of iron and of praseodymium in the proportions, by weight, $CeO_2$ 80%, $Fe_2O_3$ 10% and $Pr_6O_{11}$ 10%.

Iron, praseodymium and ceric nitrate solutions are prepared with the proportions required for obtaining the final desired composition.

In a first stage, the iron nitrate solution is introduced into the reactor. This solution is then preneutralized with aqueous ammonia to r=0.5, for being defined here for iron in the same way as that given above for cerium. This makes it possible to form a colloidal iron oxide solution in situ.

The ceric nitrate solution, the initial free acidity of which was neutralized beforehand by addition of aqueous ammonia to r=0, is then added and then the praseodymium nitrate solution is added.

The mixture thus obtained is then placed in an autoclave. The continuation of the treatment is identical to that described in Example 1. The product, calcined under air for 6 hours at 450° C., exhibits a specific surface of 105 $m^2/g$. TEM-EDS analysis shown a heterogeneity of less than 10 $nm^2$.

EXAMPLE 3

This example illustrates the synthesis by coprecipitation of an oxide of cerium and of manganese in the proportions, by weight, $CeO_2$ 90% and $MnO_2$ 10%.

A mixture of cerous nitrate and of manganese nitrate is prepared in the proportions necessary in order to obtain the final composition. Hydrogen peroxide is added to this mixture so as to ensure the oxidation of Ce(III) to Ce(IV) and of Mn(II) to Mn(IV). The amount of hydrogen peroxide is in 10% excess with respect to the stoichiometric amount necessary for this oxidation. The whole mixture is introduced into an aqueous ammonia vessel heel with mechanical stirring.

A precipitate is then recovered by filtration which is then washed and then resuspended in an excess of water and then filtered again.

The product, calcined under air for 6 hours at 400° C., exhibits a specific surface of 99 $m^2/g$. TEM-EDS analysis shows a heterogeneity of less than 10 $nm^2$.

EXAMPLE 4

This example illustrates the synthesis of an oxide of cerium and of praseodymium in the proportions, by weight, $CeO_2$ 95% and $Pr_6O_{11}$ 5%.

The preparation is carried out an in Example 1 with the proportions required in order to obtain the final desired composition.

The product, after calcination under air for 6 hours at 400° C., exhibits a specific surface of 149 $m^2/g$.

EXAMPLE 5

This example illustrates the properties of the compositions of the invention in controlling $H_2S$ emissions.
Preparation of the Catalysts:

In order to carry out the test which makes it possible to quantify the amount of $H_2S$ emitted, which will be described below, the samples must be impregnated with platinum. Impregnation of platinum on cerium-based oxides is carried out in the following way:

- 10 g of oxide, calcined beforehand at 500° C. under air for 6 hours, are placed in a beaker;
- then 0.1 g of platinum is introduced from a 3.74 g/l aqueous hexachloroplatinic acid solution. After stirring for tree hours at room temperature, the suspension is centrifuged at 1500 rev/min for 15 minutes and the solid recovered is then dried at 120° C. for 12 hours and then calcined at 480° C. for 6 hours under air.

Description of the Test Which Makes it Possible to Quantify the Amount of $H_2S$ Emitted:

A sample of 0.1 g of oxide platinized according to the method described above is activated "in situ" to 450° C. while sweeping with a mixture of 5% by volume of hydrogen in nitrogen with a rise gradient of 10° C. per minute. The total gas flow rate is 30 l/h and the test is carried out at atmospheric pressure. A nitrogen purge is then carried out for 10 minutes and the catalyst is then subjected to a gas flow which contains oxygen, sulphur dioxide and nitrogen for 30 minutes. The composition by volume of the mixture is as follows:

$O_2$: 4.5%

$SO_2$: 54 ppm $N_2$: 95.33%

After this sulphation period, a nitrogen purge of 30 l/h is carried out for 10 minutes. The catalyst is then swept with a mixture containing 2% by volume of hydrogen in nitrogen for 20 minutes at a total glow rate of the mixture of 30 l/h. The amount of $H_2S$ emitted during this reduction period is determined continuously using a Hartmann and Braun Radas 2 UV analyser. This sulphation/reduction cycle can be repeated.

The total amount of $H_2S$ desorbed from the catalyst at 450° C. is determined by integrating the curve: $H_2S$ concentration in the outlet gas of the reactor=f(t) where t is the time. The results are expressed in μmol of desorbed $H_2S$ per 1 g of platinized oxide introduced into the tent.

Description of the Test Which Makes it Possible to Quantify the Storage of Oxygen The buffering power of a composition with respect to oxygen is evaluated by its ability to store oxygen in an oxidizing medium and to restore it in a reducing medium. The test evaluates the ability of the composition to successively oxidize pulses of oxygen and then of carbon monoxide. The method employed is known as alternating.

The carrier gas is pure helium at a flow rate of 10 l/h. The injections are carried out via a loop containing 16 ml of gas. The CO pulses are produced using a gas mixture containing 5% of CO diluted in helium whereas the $O_2$ pulses are produced from a gas mixture containing 2.5% of $O_2$ diluted in helium. Analysis of the gases is carried out by chromatography using a thermal conductivity detector.

The amount of oxygen consumed or the proportion of CO converted makes it possible to determine the oxygen storage capacity. The value characteristic of the oxygen storage power is expressed in ml of oxygen per gram of product introduced and it is measured at 400° C. The measurements of the oxygen storage power given in the following table are carried out on products pretreated at 900° C. under air for 6 hours in a muffle furnace.

Results

| Tests | μmol of H$_2$S desorbed per m$^2$ of platinized oxide introduced into the test | Oxygen storage |
|---|---|---|
| 1 Comparative CeO$_2$ | 1.5 | 0.8 |
| 2 Product of Example 1 | 0.2 | 2.1 |
| 3 Product of Example 2 | 0.3 | 3.9 |
| 4 Product of Example 3 | 0.25 | 2 |
| 5 Product of Example 4 | 1.3 | 1.8 |

The product of Test 1 is an oxide prepared by thermohydrolysis of a solution of a cerium(IV) salt in the presence of a base. It has a specific surface of 100 m$^2$/g after calcination for 6 hours at 600° C.

What is claimed is:

1. A process for the treatment of exhaust gases from an internal combustion engine which comprises contacting said gases with a catalytic composition consisting essentially of cerium oxide, iron oxide, and praseodymium oxide in combination with platinum, rhodium, palladium, ruthenium or iridium.

2. The process of claim 1, wherein the catalytic composition exhibits an oxygen storage capacity of at least 1.0 ml. oxygen per gram of said catalytic composition.

3. The process of claim 1, wherein the catalytic composition exhibits an oxygen storage capacity of at least 1.5 ml. oxygen per gram of said catalytic composition.

4. The process of claim 1, wherein said catalytic composition is applied to a support for the treatment of said gases.

5. The process of claim 1, wherein the composition further comprises zirconium.

6. The process of claim 1, wherein the catalytic composition exhibits an oxygen storage capacity of at least 1.0 ml. oxygen per gram of said catalytic composition.

7. The process of claim 6, wherein said oxygen storage capacity is at least 1.5 ml. oxygen per gram.

8. The process of claim 1, wherein the catalytic composition has been prepared by a process comprising the steps of:

a) adding in a liquid medium a mixture containing cerium oxide, iron oxide, and praseodymium oxide;

b) precipitating the mixture;

c) recovering the precipitate thus obtained;

d) calcining the precipitate; and e) impregnating said precipitate with platinum, rhodium, palladium, ruthenium or iridium.

9. The process of claim 8, wherein said precipitate is obtained through heating the liquid medium containing the mixture.

10. The process of claim 8, wherein said precipitate is obtained through the addition of a basic compound without exposure to heat.

11. The process of claim 10, wherein the liquid medium is also heated.

12. The process of claim 8, further comprising the step of adding hydrogen peroxide.

13. A process for the treatment of exhaust gases according to claim 1, wherein the catalytic composition consisting essentially of cerium oxide, iron oxide, and praseodymium oxide is impregnated with platinum, rhodium, palladium, ruthenium or iridium.

14. A process for the treatment of exhaust gases from an internal combustion engine which comprises contacting said gases with a catalytic composition consisting essentially of cerium oxide, iron oxide, manganese oxide, and praseodymium oxide in combination with platinum, rhodium, palladium, ruthenium or iridium.

15. A process for the treatment of exhaust gases according to claim 14, wherein catalytic composition consisting essentially of cerium oxide, iron oxide, manganese oxide, and praseodymium oxide is impregnated with platinum, rhodium, palladium, ruthenium or iridium.

* * * * *